(12) United States Patent
Tuomi et al.

(10) Patent No.: US 7,082,297 B2
(45) Date of Patent: Jul. 25, 2006

(54) PERFORMING AUTHENTICATION

(75) Inventors: Jukka Tuomi, Tampere (FI); Timo Takamaki, Pirkkala (FI)

(73) Assignee: Nokio Corporation, Espoo (FI)

( * ) Notice: Subject to any disclaimer, the term of this patent is extended or adjusted under 35 U.S.C. 154(b) by 226 days.

(21) Appl. No.: 10/720,753

(22) Filed: Nov. 25, 2003

(65) Prior Publication Data

US 2004/0166831 A1    Aug. 26, 2004

(30) Foreign Application Priority Data

Nov. 28, 2002  (GB)  ................................. 0227777.0

(51) Int. Cl.
*H04M 1/66*  (2006.01)

(52) U.S. Cl. ...................... 455/411; 455/410; 455/433; 455/432.1; 455/432.2; 455/404.2; 455/456.1

(58) Field of Classification Search ................ 455/411, 455/410, 433, 432.1, 432.3, 404.2, 456.1, 455/456.2, 456.3, 456.5

See application file for complete search history.

(56) References Cited

U.S. PATENT DOCUMENTS

| | | | |
|---|---|---|---|
| 5,799,084 A * | 8/1998 | Gallagher et al. ........... 380/248 |
| 6,070,073 A * | 5/2000 | Maveddat et al. .......... 455/428 |
| 6,236,852 B1 * | 5/2001 | Veerasamy et al. ......... 455/411 |
| 6,285,882 B1 | 9/2001 | Cornillat et al. |
| 6,449,479 B1 * | 9/2002 | Sanchez ...................... 455/433 |
| 6,463,055 B1 * | 10/2002 | Lupien et al. ............... 370/353 |
| 6,731,932 B1 * | 5/2004 | Rune et al. ............... 455/432.1 |
| 6,804,506 B1 * | 10/2004 | Freitag et al. ............... 455/411 |
| 2002/0061746 A1 * | 5/2002 | Jo et al. ...................... 455/433 |
| 2002/0107964 A1 * | 8/2002 | Tomoike ...................... 709/225 |
| 2003/0051041 A1 * | 3/2003 | Kalavade et al. ............ 709/229 |
| 2003/0084321 A1 * | 5/2003 | Tarquini et al. ............. 713/200 |
| 2005/0048984 A1 * | 3/2005 | Foster et al. ................ 455/453 |

FOREIGN PATENT DOCUMENTS

| | | |
|---|---|---|
| EP | 1 209 935 A1 | 5/2002 |
| EP | 1 257 143 A1 | 11/2002 |
| WO | WO 99/39526 | 8/1999 |
| WO | WO 01/15463 A2 | 3/2001 |
| WO | WO 01/80576 A2 | 10/2001 |

OTHER PUBLICATIONS

Patent Abstract of KR 2001002308 A dated Jan. 15, 2001.
"Universal Mobile Telecommunications System (UMTS); Supercharger: Stage 2 (3G TS 23.116 version 3.0.0 Release 1999)" ETSI TS 123 116 V3.0.0, Mar. 2000; pp. 1-27.

* cited by examiner

*Primary Examiner*—Jean Gelin
*Assistant Examiner*—Huy Phan
(74) *Attorney, Agent, or Firm*—Squire, Sanders & Dempsey LLP

(57) ABSTRACT

A method for performing authentication in a communication system comprising an authentication server, and a user profile store storing user profiles for users of the communication system, the method comprising: transmitting from the authentication server to the user profile store a request for the user profile of a user; receiving at the authentication server a response to the request; determining whether the response is indicative of an error; and if the response is indicative of an error, transmitting from the authentication server to the user profile store a message of a type such as to trigger the user profile store to perform a location update procedure in respect of the user.

15 Claims, 2 Drawing Sheets

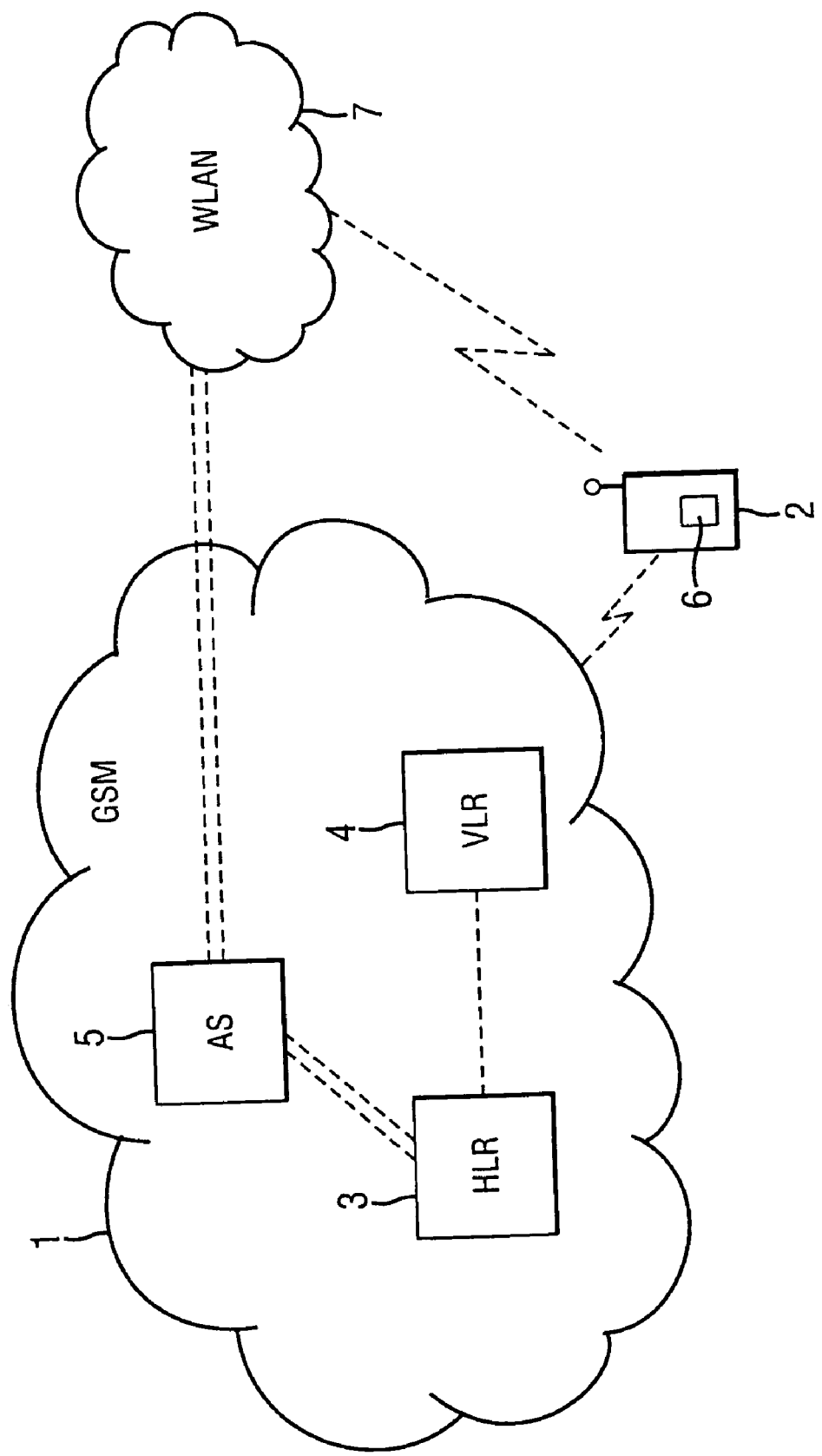

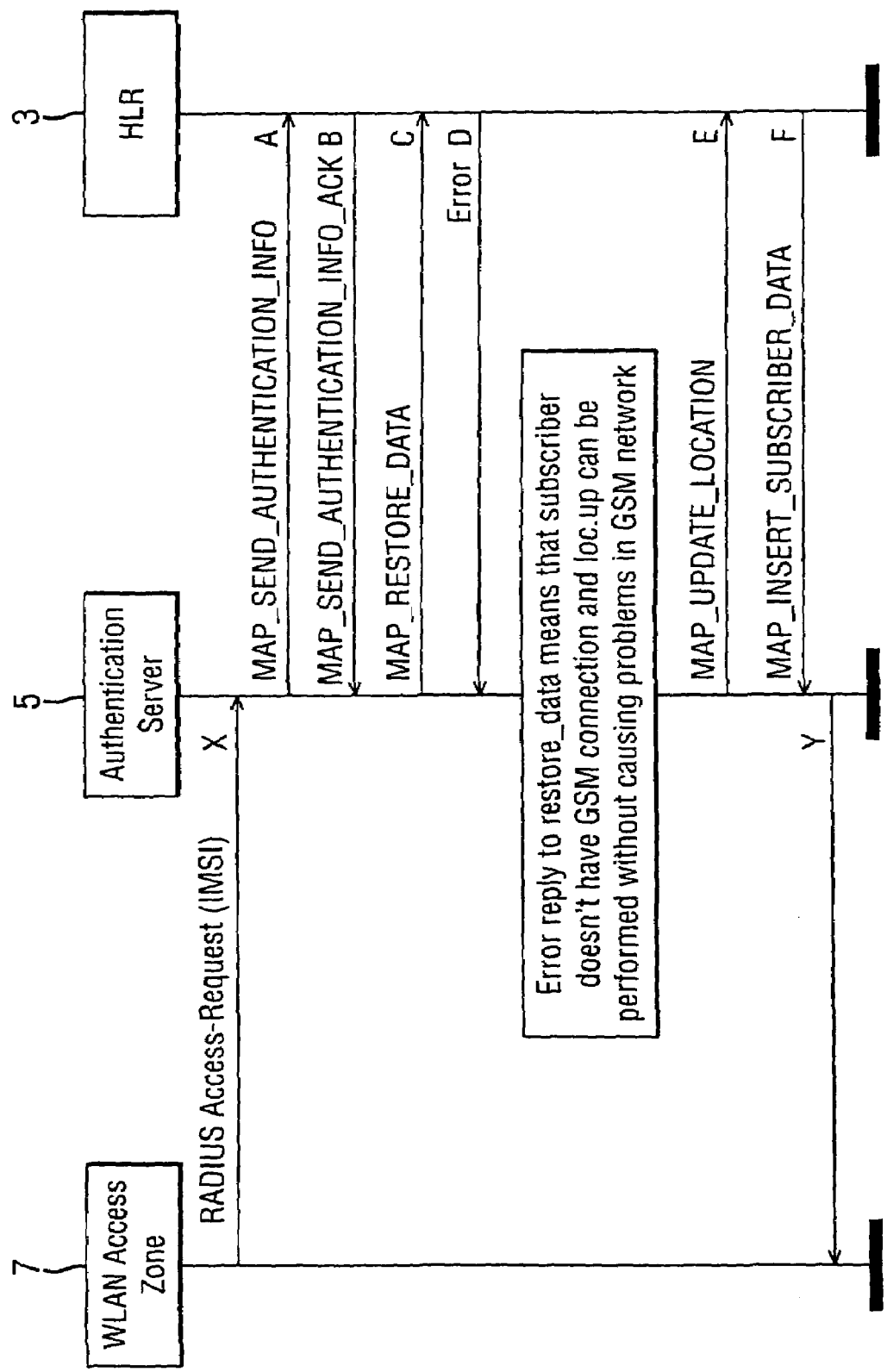

PERFORMING AUTHENTICATION

This invention relates to performing authentication in a communication system.

In many communication systems, for example telephony systems, users are authenticated before they are provided with access to resources. The resources could, for example, be data transmitting and/or receiving services, access to a network or to data, or access to configuration options.

FIG. 1 shows one such system. FIG. 1 is a schematic diagram of a GSM (Global System for Mobile Communications) communication system. Only the relevant components of the system are shown in FIG. 1. The system shown in FIG. 1 comprises a GSM network 1, with which a terminal 2 can communicate. The network comprises a home location register (HLR) 3, a visitor location register (VLR) 4 and an authentication server (AS) 5. The system also includes a wireless local area network (WLAN) 7. The terminal is capable of communicating in both the GSM network and the WLAN.

The HLR and the VLR together provide facilities that are primarily used for call-routing and roaming. The HLR stores a user profile for each subscriber to the network 1, including administrative information for the subscriber. It can also store information defining the current location of the terminal being used by that subscriber. The current location of the terminal is typically held in the form of the signalling address of the VLR associated with the mobile station. If the terminal is operating in network 1 then that will be the address of VLR 4. If the terminal is roaming in another network then it is the address of the VLR of that network. There is logically a single HLR in each GSM network, although it may be implemented as a distributed database. The VLR stores selected administrative information from the HLR, necessary for call control and provision of services, for each terminal that is currently located in the geographical area for which the VLR is responsible.

The authentication server is used to authenticate a terminal when services are to be provided to it. One way in which this is performed is as follows. The terminal 2 incorporates a subscriber identity module (SIM) 6 which stores a secret authentication key and can perform an authentication function taking as operands that key and data supplied to the SIM by the terminal. The result of the function is returned to the terminal. The secret key is also stored in the user profile for the subscriber, held at his HLR. When the subscriber is to be authenticated his terminal is supplied with challenge data by the entity that wishes to have him authenticated. The challenge data is passed to the SIM, which computes the authentication function of the challenge data and the stored secret key. The result of that function is returned to the network, for example to the entity that wishes to have the subscriber authenticated. That result can then be supplied along with the challenge data to the authentication server 5, which retrieves the secret key for the subscriber from the subscriber's HLR and computes the authentication function of that key and the challenge data. If the result of that computation matches the result supplied to the authentication server then the authentication server returns a message to the entity that wishes to have the subscriber authenticated to indicate that the subscriber has been authenticated. Otherwise, the subscriber is not authenticated. Extensible authentication protocol (EAP) may be used for this purpose.

The conventional sequence of signalling for the AS to obtain subscriber profile information from an HLR is as follows:

A. The AS transmits a MAP_SEND_AUTHENTICATION_INFO message to the HLR.
B. The HLR responds with a MAP_SEND_AUTHENTICATION_INFO_ACK acknowledgement message.
C. The AS transmits a MAP_RESTORE_DATA message to the HLR.
D. The HLR responds with a MAP_INSERT_SUBSCRIBER_DATA message providing the subscriber data to the AS.

One example of a situation in which authentication can be used is in authenticating a terminal to help determine whether it should be allowed access to a wireless local area network (WLAN) (7 in FIG. 1). If this form of authentication is in use, when a subscriber tries to access the WLAN the entity that controls access to the WLAN authenticates the subscriber's identity by means of the AS of the GSM network. This requires the AS to retrieve the subscriber's user profile from his HLR. Even if it is capable of operation in both networks, the terminal need not be communicating with or connected to the GSM network when it is trying to access the GSM network: it could be out of range of the GSM network, or its GSM transceiver could be turned off.

In the above scenario, the GSM network is being used to assist in the authentication of a terminal seeking to access another network. Cross-network authentication of this type is a somewhat different situation from that which was anticipated when GSM HLRs were first developed. Before cross-network authentication of this type was widely anticipated, it may have been supposed that the terminal that is to be authenticated would be connected to the GSM network. However that is not necessarily the case. Therefore, it may be anticipated that problems could arise in obtaining the subscriber profile from an HLR in order to perform authentication in this scenario.

For example, the applicant has discovered that HLRs manufactured by at least one manufacturer will not return a subscriber profile in response to a MAP_RESTORE_DATA message unless they are storing a record of the address of a VLR for that subscriber, and that such HLRs clear their records of the VLR associated with a subscriber after a period of around three days. Therefore, with these HLRs, if the terminal has not communicated with the GSM network in the days before the time at which it is seeking to access the WLAN it may have no VLR allocated it and the HLR may therefore not return the subscriber profile in response to a MAP_RESTORE_DATA message. In that case the AS would be unable to authenticate it. Some other HLRs are capable of responding as the AS would require, but do not have that as their default configuration. Such HLRs might need to be reconfigured to assure that they do provide the subscriber profile to the AS.

Some HLRs implement a mechanism whereby a subscriber account is activated after the first GSM location update takes place. This would cause a problem if a SIM-card were to be used only for WLAN authentication—that is if the end-user used one SIM for normal GSM voice services and another for WLAN data-access. In that case the network operator would have to specify different instructions from normal when providing the WLAN (data-only) SIM-card. If the normal SIM-card distribution process were followed, in which the subscription is updated automatically by the end-user when he initiates the first location update, the data only SIM-card would not be activated. Activating the data SIM would require someone to perform a location update using that SIM before it is given to the end-user, which would be an extra step in SIM-card distribution and a potential cause of errors.

There is therefore a need for an improved way of performing authentication, and particularly for obtaining user profile data.

According to the present invention there is provided a method for performing authentication in a communication system comprising an authentication server, and a user profile store storing user profiles for users of the communication system, the method comprising: transmitting from the authentication server to the user profile store a request for the user profile of a user; receiving at the authentication server a response to the request; determining whether the response is indicative of an error; and if the response is indicative of an error, transmitting from the authentication server to the user profile store a message of a type such as to trigger the user profile store to perform a location update procedure in respect of the user.

According to a second aspect of the present invention there is provided an authentication server for performing authentication in a communication system comprising a user profile store storing user profiles for users of the communication system, the authentication server being arranged to, in order to perform authentication: transmit from the authentication server to the user profile store a request for the user profile of a user; receive at the authentication server a response to the request; determine whether the response is indicative of an error; and if the response is indicative of an error, transmit from the authentication server to the user profile store a message of a type such as to trigger the user profile store to perform a location update procedure in respect of the user.

According to a third aspect of the present invention there is provided a communication system comprising: a user profile store storing user profiles for users of the communication system; and an authentication server (AS) for performing authentication in the communication system and being arranged to, in order to perform authentication: transmit from the authentication server to the user profile store a request for the user profile of a user; receive at the AS a response to the request; determine whether the response is indicative of an error; and if the response is indicative of an error, transmit from the authentication server to the user profile store a message of a type such as to trigger the user profile store to perform a location update procedure in respect of the user.

Preferably the said message is of a type such as to trigger the user profile store to perform the location update and subsequently transmit the user profile of the user to the authentication server.

The user profile store is suitably a user profile store of a GSM network. The user profile store is preferably a home location register (HLR).

The user profile store is suitably such as to: in some circumstances return to the authentication server the user profile of the user in response to the request for the user profile of the user; and in other circumstances return to the authentication server an error message in response to the said request. The said other circumstances preferably include the user not having been in communication with the network of which the user profile store is a part for a prolonged period—for example one or two days or more. The user profile store may be such as to return to the authentication server the user profile of the user in response to the said request only if it stores a location for the user, and the said other circumstances may include the user profile store having deleted any location of the user from its data store.

The said request is preferably a message according to the MAP (mobile application part) protocol, most preferably a MAP_RESTORE_DATA message.

The message of a type such as to trigger the user profile store to perform a location update procedure in respect of the user is preferably a message according to the MAP protocol, most preferably a MAP_UPDATE_LOCATION message or a MAP_UPDATE_GPRS_LOCATION message.

The method may comprise: receiving at the authentication server the user profile of the user from the user profile store; and authenticating credentials of the user by means of the received user profile; and wherein if the credentials are correctly authenticated the user is granted access to a resource, and otherwise the user is denied access to the resource. The resource suitably includes access to a network other than the one of which the user profile store is a part. The network other than the one of which the user profile store is a part may, for example, be a wireless local area network.

The user is preferably a subscriber, most preferably a subscriber to the network of which the user profile store is a part. The user/subscriber may access the network by means of a terminal. Preferably the terminal is capable of wireless (e.g. radio) communication with the network. The terminal may be a mobile station. The terminal may be a mobile telephone or a mobile data device. The terminal may be capable of communicating with (and preferably holding) a user identity unit, for example a SIM or USIM (UMTS (universal mobile telephone system) SIM), including data by means of which the terminal can take part in the authentication process. The terminal is preferably capable of communicating in networks of at least two different types. One of those is preferably the network of which the user profile store is a part. The other is preferably the resource to which access is sought.

The authentication process preferably includes the steps of: the user seeking to gain access to a resource; the terminal in use by the user forming authentication data that can be authenticated by means of the user profile of the user, and transmitting that data directly or indirectly to the authentication server; the authentication server authenticating the authentication data (preferably as described above); and the user being granted or denied access to the resource accordingly.

The present invention will now be described by way of example with reference to the accompanying drawings.

In the drawings:

FIG. 1 is a schematic partial diagram of a GSM communication network; and

FIG. 2 shows signalling during authentication according to an embodiment of the present invention.

The present system may be implemented in a system that is schematically the same as that shown in FIG. 1. In describing the present system equivalent components of the system will be referred to as for FIG. 1. However, in the present system the functionality of the AS is adapted from that of a conventional AS.

As indicated above, problems can arise when an AS needs to determine a subscriber profile from an HLR but the HLR is in such a state that it will not return a profile for the subscriber in question. One way to address this is to configure the AS so that it initiates a location update for the subscriber if the request for a subscriber profile is unacceptable. This is described in more detail below.

To recap, the conventional sequence of signalling for the AS to obtain subscriber profile information from an HLR is as follows:

A. The AS transmits a MAP_SEND_AUTHENTICATION_INFO message to the HLR.

B. The HLR responds with a MAP_SEND_AUTHENTICATION_INFO_ACK acknowledgement message.

C. The AS transmits a MAP_RESTORE_DATA message to the HLR.

D. The HLR responds with a MAP_INSERT_SUBSCRIBER_DATA message providing the subscriber data to the AS.

If the HLR is in such a state that it will not return a profile for the subscriber in question then it returns an error message at stage D.

The AS of the present system is configured so that if, when it is seeking to retrieve a user profile from an HLR, it receives an error message in response to the message it sends at stage C then it initiates a location update for the subscriber in question. The HLR is then expected to perform a location update for the subscriber and return the subscriber's user profile. Therefore the following additional steps are taken after an error is returned at step D:

E. The AS transmits a MAP_UPDATE_LOCATION message to the HLR.

F. The HLR performs a location update for the subscriber and responds to the AS with a MAP_INSERT_SUBSCRIBER_DATA message providing the subscriber data to the AS.

It might be expected that the AS transmitting a MAP_UPDATE_LOCATION message to the HLR would cause problems for the subscriber's connection in the GSM network. However, the AS transmits the MAP_UPDATE_LOCATION message when an error is received at step D. The reason behind that error signal is that the HLR has deleted the VLR address for the subscriber due to the subscriber not having been connected to the GSM network. Therefore, if steps E and F are taken, the subscriber is expected to be not actually connected to the GSM network.

The signalling steps in the case of an error being received at step D are illustrated in FIG. 2. This figure also shows the signalling between the AS 5 and the WLAN access zone 7 (steps X and Y). This signalling may use the RADIUS protocol. Step X is the request from the WLAN access zone for authentication of the subscriber. This may include the authentication data and the challenge data from which it was derived, together with an identification of the subscriber. Step Y is the message that indicates to the WLAN access zone whether access is to be permitted or denied based on the result of the authentication.

The method described above can enable a GSM subscriber's user profile to be reliably used for authentication of access to services when the subscriber/terminal is not connected to the GSM network. Such services may be access to a network other than the GSM network. GSM networks should be understood to include networks based on derivative standards of GSM.

The specific messages that are used could be varied from those described above. Instead of a MAP_UPDATE_LOCATION message being used at step 5, a MAP_UPDATE_GPRS_LOCATION message could be used. It also triggers the HLR to perform a location update for the subscriber and is replied to by the HLR with a MAP_INSERT_SUBSCRIBER_DATA message.

It should be noted that the signalling set out above utilises the MAP protocol. Although other signalling protocols could be used, the MAP protocol is advantageous.

The authentication server may be part of the network of which the HLR is a part (as illustrated in FIG. 1) or part of another network, or may be a stand-alone functionality. The authentication server may be provided as a single unit, or may be a functionality distributed between two or more physical units and/or locations.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for performing authentication in a communication system comprising an authentication server (AS), and a user profile store storing user profiles for users of the communication system, the method comprising:

transmitting from the authentication server to the user profile store a request for the user profile of a user;

receiving at the AS a response to the request;

determining whether the response is indicative of an error; and if the response is indicative of an error, transmitting from the authentication server to the user profile store a message of a type that triggers the user profile store to perform a location update procedure in respect of the user.

2. A method as claimed in claim 1, wherein the message is of a type that triggers the user profile store to perform the location update and subsequently transmit the user profile of the user to the authentication server.

3. A method as claimed in claim 1, wherein the user profile store is a user profile store of a GSM network.

4. A method as claimed in claim 1, wherein the user profile store is a home location register (HLR).

5. A method as claimed in claim 1, wherein the user profile store is configured to:

in some circumstances return to the authentication server the user profile of the user in response to the said request; and in other circumstances return to the authentication server an error message in response to the said request.

6. A method as claimed in claim 5, wherein the said other circumstances include the user not having been in communication with the network of which the user profile store is a part for a prolonged period.

7. A method as claimed in claim 1, wherein the said request is a message according to the MAP protocol.

8. A method as claimed in claim 7, wherein the said request is a MAP_RESTORE_DATA message.

9. A method as claimed in claim 1, wherein the message of a type that triggers the user profile store to perform a location update procedure in respect of the user is a message according to the MAP protocol.

10. A method as claimed in claim 9, wherein the said the message of a type that triggers the user profile store to perform a location update procedure in respect of the user is a MAP_UPDATE_LOCATION or a MAP_UPDATE_GPRS_LOCATION message.

11. A method as claimed in claim 1, further comprising:

receiving at the authentication server the user profile of the user from the user profile store; and authenticating credentials of the user by means of the received user profile; and wherein if the credentials are correctly authenticated the user is granted access to a resource, and otherwise the user is denied access to the resource.

12. A method as claimed in claim 11, wherein the resource includes access to a network other than the one of which the user profile store is a part.

13. A method as claimed in claim 12, wherein the network other than the one of which the user profile store is a part is a wireless local area network.

14. An authentication server (AS) for performing authentication in a communication system comprising a user profile store storing user profiles for users of the communication system, the authentication server being arranged to, in order to perform authentication:

transmit from the authentication server to the user profile store a request for the user profile of a user;

receive at the AS a response to the request;

determine whether the response is indicative of an error; and if the response is indicative of an error, transmit from the authentication server to the user profile store a message of a type that triggers the user profile store to perform a location update procedure in respect of the user.

15. A communication system comprising:

a user profile store storing user profiles for users of the communication system; and an authentication server (AS) for performing authentication in the communication system and being arranged to, in order to perform authentication:

transmit from the authentication server to the user profile store a request for the user profile of a user;

receive at the AS a response to the request;

determine whether the response is indicative of an error; and if the response is indicative of an error, transmit from the authentication server to the user profile store a message of a type that triggers the user profile store to perform a location update procedure in respect of the user.

* * * * *

UNITED STATES PATENT AND TRADEMARK OFFICE
CERTIFICATE OF CORRECTION

PATENT NO. : 7,082,297 B2  Page 1 of 1
APPLICATION NO. : 10/720753
DATED : July 25, 2006
INVENTOR(S) : Jukka Tuomi et al.

It is certified that error appears in the above-identified patent and that said Letters Patent is hereby corrected as shown below:

On the Title Page of the Patent

In Section (73)

The Assignee should read:

--Nokia Corporation--

Signed and Sealed this

Twenty-eighth Day of November, 2006

JON W. DUDAS
*Director of the United States Patent and Trademark Office*